United States Patent
Dickinson

[15] 3,643,313
[45] Feb. 22, 1972

[54] DEVICE FOR REMOVING BANDING MATERIAL FROM A BALE OF CROP MATERIAL

[72] Inventor: Lawrence C. Dickinson, Reno, Nev.
[73] Assignee: Sperry Rand Corporation, New Holland, Pa.
[22] Filed: Aug. 25, 1969
[21] Appl. No.: 855,796

[52] U.S. Cl. ..........................................29/200 D, 214/6 B
[51] Int. Cl. ........................................................B23p 19/00
[58] Field of Search ................29/200 B, 200 D, 427; 130/1; 214/6 B

[56] References Cited

UNITED STATES PATENTS

| | | | |
|---|---|---|---|
| 2,820,282 | 1/1958 | Schneider, Jr. | 29/200 D |
| 3,502,230 | 3/1970 | Grey et al. | 214/6 B |
| 3,513,522 | 5/1970 | Thomson | 29/200 D |
| 3,515,291 | 6/1970 | Grey et al. | 214/6 B |
| 3,521,347 | 7/1970 | Bentley | 29/200 D X |

Primary Examiner—Granville Y. Custer, Jr.
Attorney—Joseph A. Brown, John C. Thompson, James J. Kennedy and George C. Bower

[57] ABSTRACT

A device, adaptable for use in combination with a single bale unloading wagon, for cutting and twisting the retaining band, such as twine or wire, from a bale of crop material by first severing the band with a cam actuated cutting means and then winding the severed band around a pair of twisting bars to remove the band from the bale.

16 Claims, 14 Drawing Figures

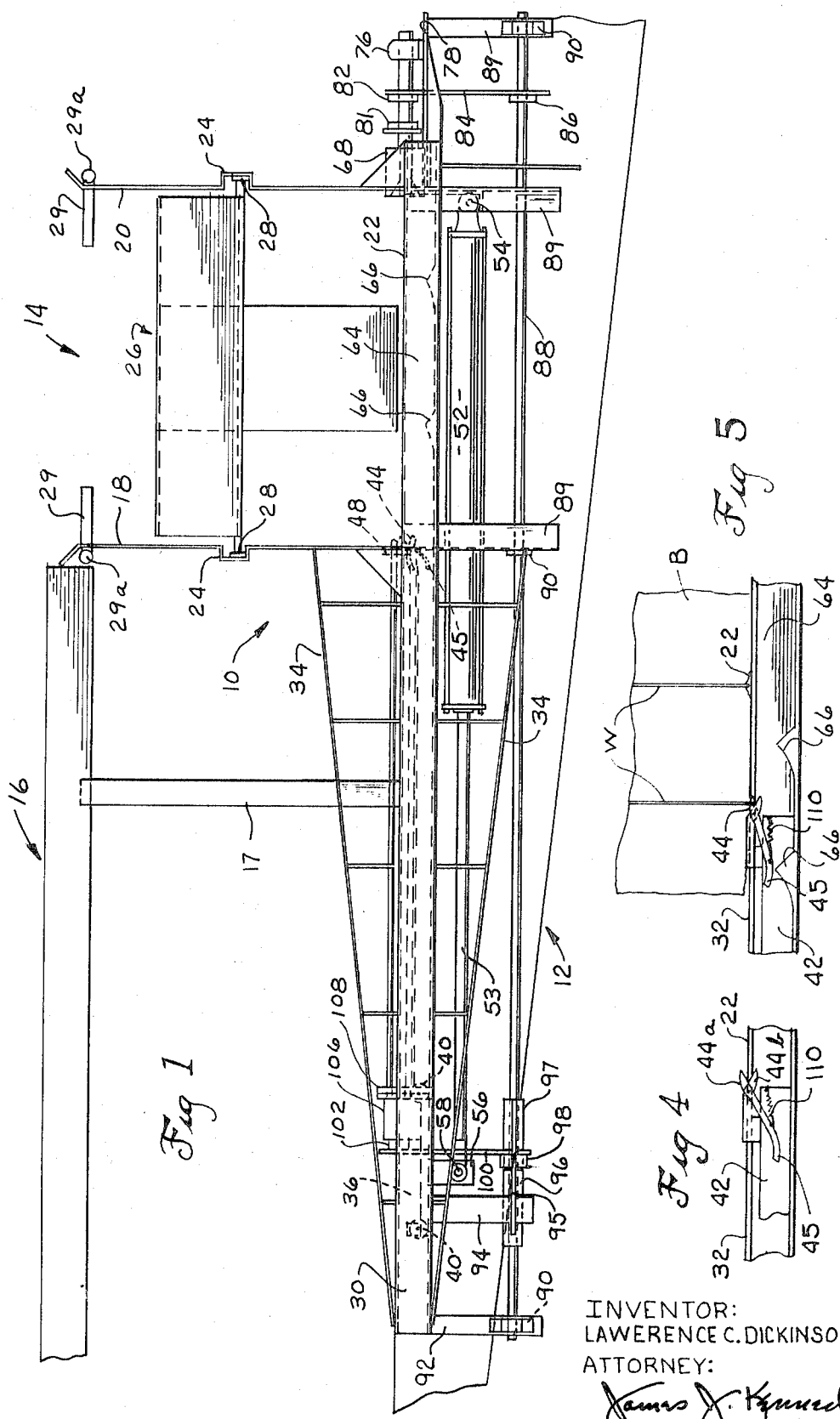

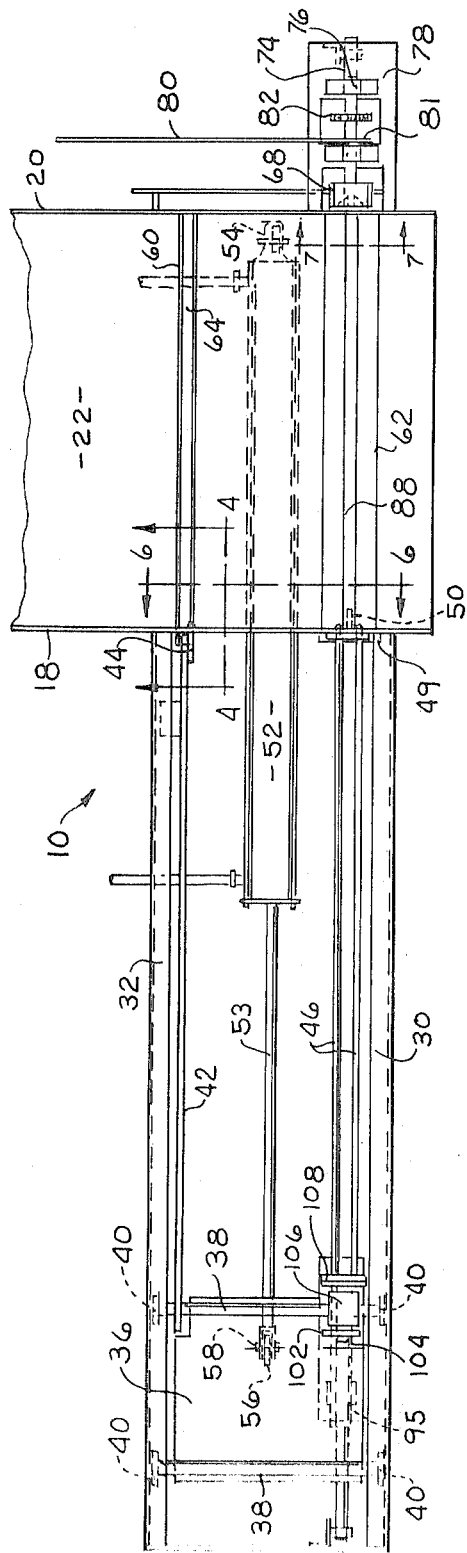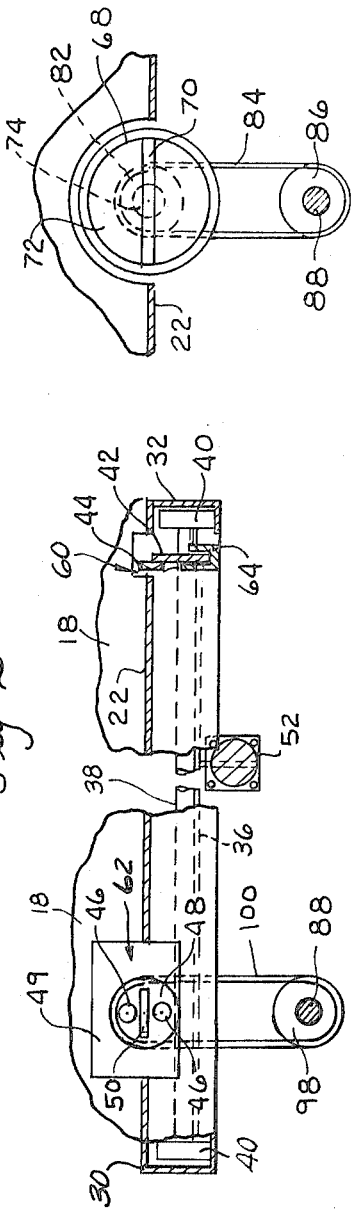

INVENTOR:
LAWERENCE C. DICKINSON
ATTORNEY:

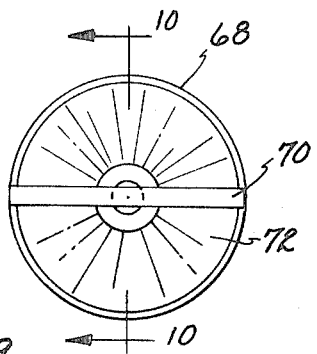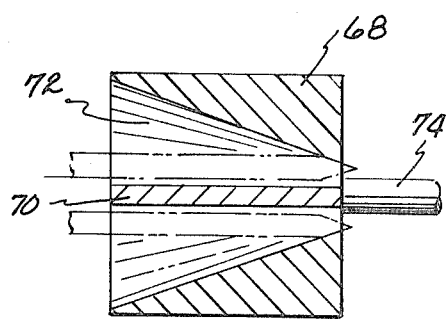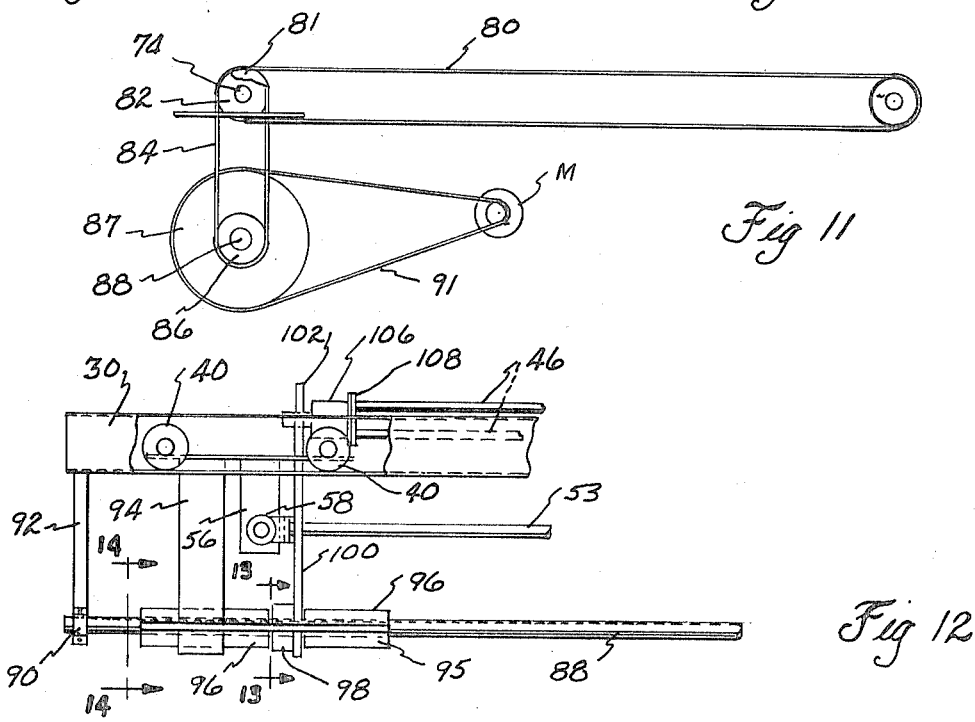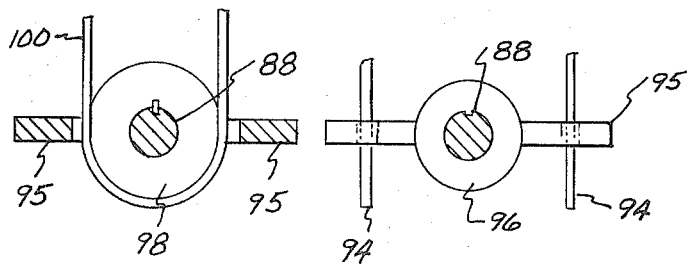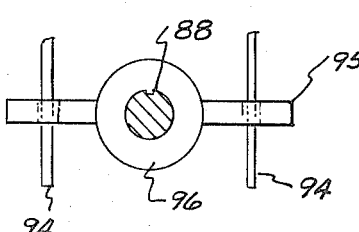
INVENTOR
LAWERENCE C. DICKINSON
BY
ATTORNEY

DEVICE FOR REMOVING BANDING MATERIAL FROM A BALE OF CROP MATERIAL

BACKGROUND OF THE INVENTION

Agricultural materials are usually formed into aggregate, generally uniform packages or bundles, called bales, by appropriate baling machines or apparatus. The bales are, for the most part, compressed into a rectangular shape and they are bound together by bands or ties usually comprised of wire, rope or twine. These bands are wrapped around the bale as it is formed in the baler and extend longitudinally of the bale. Two or three of the bands may be used to retain the bale in its compressed form depending on the size and weight of the bale. All the bands extend parallel to each other in a spaced-apart relation around the bale. The bales, packaged in this form, are now in a convenient size and shape for transport and storage.

In most instances, the baled crop material will be used as feed or feed supplement for livestock. It is a common occurrence in feeding all types of livestock to supplement grain and forage feeds with hay, or the like, by placing the hay bales in a feed trough, feed lot or other feed area and permitting the livestock to feed directly from the bales. In most cases, it is not desirable for the livestock to ingest the bale banding material, particularly if that material happens to be wire. There are some digestable synthetic binders available, but these have not yet been accepted in general use for a variety of reasons. Therefore, the banding materials, the wire or twine, must be removed either before or after the bales are placed in the feeding area, but at least before the livestock are permitted to feed from the crop material.

The binding removal is usually done by hand and if a large herd is to be fed, the job may occupy the time of several laborers. Many farmers and ranchers are using more and more mechanization in handling bales because farm hands are just not available in sufficient quantities to perform the traditional manual handling of hay bales. The automatic bale handling wagon and particularly the single bale unloading wagons are now experiencing wide spread acceptance because they enable one man to do the work which previously required the efforts of two or three. The theory behind these wagons is to free valuable farm labor for other jobs, while at the same time permitting the old manual handling techniques to be accomplished far more quickly and efficiently. If the laborers are still needed on a single bale unloaded wagon to sever and remove the banding materials as the wagon moves along discharging the bales at the feed location, the efficiency of these wagons is greatly reduced. Some automatic device to strip the bales of the wire twine binders would be extremely useful.

SUMMARY OF THE INVENTION

It is therefore, the principle object of this invention to provide a device for removing banding material from a bale of crop material which would be useful by itself or in combination with an automatic bale loading and unloading wagon.

Another object of this invention is to provide a unit of very simple construction which will sever and remove a plurality of bale binders in a single operation.

A still further object of this invention is to provide a wire stripping device which will remove the bale binders and drop them free of the baled material so that they will not be ingested by livestock.

A further object of this invention is to provide a wire and twine removable device which is easily adaptable for combination with a single bale unloading wagon whereby the wire and twine of the bales being unloaded from the wagon may be removed as part of the unloading process.

Other objects of this invention will become apparent from the complete description of the device and the claims directed thereto as set forth hereinafter.

BRIEF DESCRIPTION OF THE DRAWINGS

FIG. 1 is a side elevation of the band removal device on a bale wagon.

FIG. 2 is a partial plan view of the band removal device.

FIG. 4 is a section view taken on the line 4—4 of FIG. 2, showing the cutter means in its normal position.

FIG. 5 is a partial, enlarged side view of the cutter means in the first cutting position.

FIG. 6 is a section view taken on the line 6—6 of FIG. 2.

FIG. 7 is a section view taken on the line 7—7 of FIG. 2.

FIG. 9 is a front elevational view of the receiving cup.

FIG. 10 is a view taken along the line 10—10 of FIG. 9.

FIG. 11 is a schematic view illustrating the drive for the band removing device.

FIG. 12 is a fragmentary side elevational view particularly showing portions of the drive disposed beneath a carriage adapted to move the band removing means transversely back and forth beneath a bale.

FIG. 13 is a view taken along the line 13—13 of FIG. 12.

FIG. 14 is a view taken along the line 14—14 of FIG. 12.

DESCRIPTION OF THE PREFERRED EMBODIMENT

Figure 3:
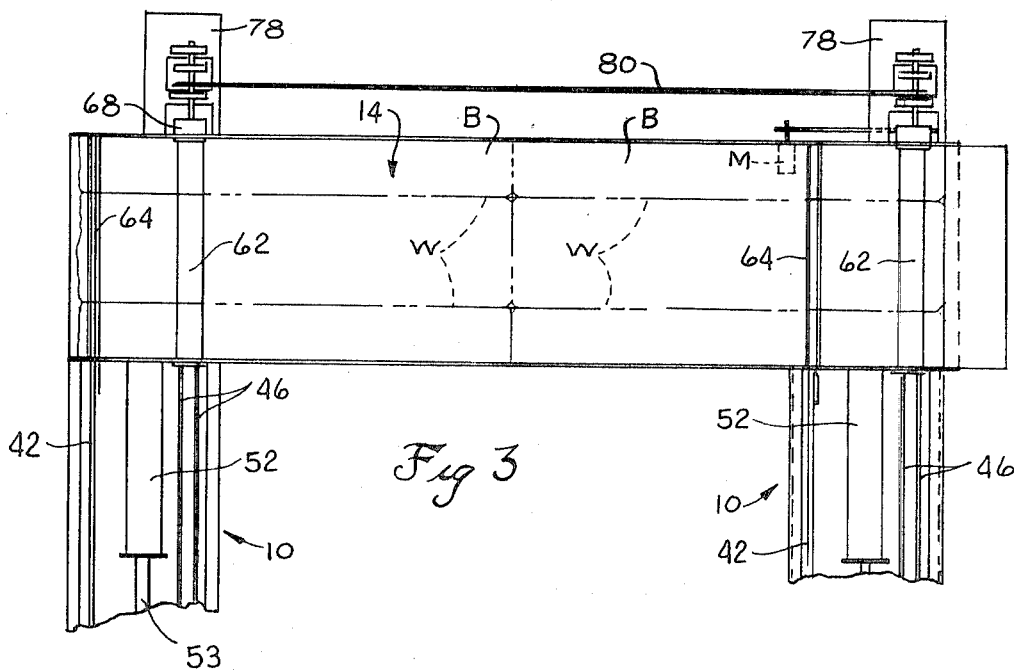
FIG. 3 is a plan view, showing two identical devices on a bale wagon.

Turning now to the drawing and particularly to FIGS. 1 and 2, a band removal device 10 is mounted on a bale wagon chassis 12, said chassis being supported by wheels, not shown, and adapted to move forwardly over the ground in a conventional manner. An unloading trough 14 is disposed on the chassis, extending transversely thereof, forwardly of a load carrying bed 16 which is positioned at the rear of the chassis and supported thereabove by a bed support 17. The load carrying bed is adapted to support and carry a plurality of bales of crop material disposed on said wagon in a plurality of side-by-side vertically extending tiers of bales forming a stack of bales. The unloading trough 14 is adapted to receive tiers of bales from said load carrying bed, one tier at a time and to unload the tiers one bale at a time from the wagon. This operation is conventional and such an unloading procedure is described in copending U.S. application Ser. No. 755,141 filed Aug. 26, 1968, now U.S. Pat. No. 3,502,230 issued Mar. 24, 1970.

The unloading trough 14 is comprised of a pair of parallel spaced-apart vertically extending sidewalls 18 and 20 and a floor portion 22. Each of the sidewalls 18 and 20 are provided with a pair of parallel longitudinally extending tracks 24 in which rollers 28 of cross conveyor 26 are positioned to permit the cross conveyor to move back and forth within the trough from one side to the other transversely of the bale wagon chassis 12. The power means to move the cross conveyor is not shown, but a hydraulic motor or cylinder could be used. Above the trough, are a plurality of bale hooks 29 which are pivotally mounted with respect to the sidewalls 18 and 20 by means of shafts 29a which extend transversely of the bale wagon behind the walls as shown in FIG. 1. The bale hooks are also suitably driven by means, not shown, to unload the bale wagon in a single bale unloading fashion.

Turning now to the details of the band removing device, it will be noted from FIG. 3, that the device may be positioned on either side of a bale wagon unloading station so that two bales at a time can be stripped of the banding material before they are discharged from the wagon. It is also possible to have additional units available to remove bands if the tier of bales being unloaded includes more than two bales in a row, a row being a plurality of end to end bales. These devices are identical and, therefore, there is no need to discuss the details of both of these devices together. As can be seen in FIGS. 1 and 2, the band removing device 10 is comprised in part of a frame structure which includes a pair of parallel opposed C-shaped bar members 30 and 32 extending longitudinally of the chassis structure 12 in spaced-apart relation. A plurality of strengthening members comprised of a series of metal straps 34 are fixed to the top and bottom portions of the C-shaped bars by welding or any other suitable means. The C-shaped bar members 30 and 32 are fixed by suitable means to the bottom portion of trough floor 22 and extend rearwardly therefrom to a position underneath the load-carrying bed 16. The strengthening members 34 are likewise fixed to the unloading trough 14 by welding or other suitable means so that a rigid frame structure is formed. A carriage 36 having a pair of shafts 38 and rollers 40 at the outward ends thereof is adapted to travel longitudinally toward and away from the unloading trough in a manner such that the rollers are received and guided by the C-shaped bar members. The carriage 36 gives lateral stability to the frame structure. Extending forwardly from a shaft 38 of the carriage 36 is a bar member 42 having a cutter means 44 at the outward end thereof. The cutter means 44 is comprised of a pair of pivotally connected cutter jaws, 44a and 44b, with jaw 44a having an elongated lever end 45 which depends from the cutter means as shown in FIG. 4. A pair of parallel, spaced apart twister bars 46 are also fixed at one end relative to the carriage by a plate 108 and extend forwardly therefrom through a support plate 48 and retainer 49. The parallel spaced twister bars 46 are open at the trough end, the trough end being that end of the trough where the bale exists during unloading as shown in FIG. 2. Plate 48 is rotatably secured within retainer 49 and the retainer 49 is fixed to the rear wall 18 of the unloading trough. As can be seen in FIG. 6, a stripper plate 50 is positioned between the twister bars 46 and extends outwardly from the face of plate 48. The stripper plate 50 is fixed by welding or other suitable means to the plate 48.

To power the carriage in a fore-and-aft direction with respect to the bale wagon and transversely of the unloading trough, a hydraulic cylinder 52, having a rod end 53, is fixed by the cylinder end to the chassis at 54 and by the rod end to a depending bracket 56 at 58, as shown in FIGS. 1 and 2. The bracket 56 is suitably secured to the underside of the carriage 36 and depends therefrom as shown. Actuation of hydraulic cylinder 52 by suitable hydraulic power source, not shown, will cause the rod end 53 to pull or push the carriage toward or away from the unloading trough 14 and as the carriage moves so does the band removing means, i.e., the cutter means and the twister bars.

The unloading trough 14 is provided with grooves 60 and 62 which extend between the sidewalls 18 and 20 and are formed in the bottom wall 22. The grooves 60 and 62 extend across the trough in a parallel and spaced apart relation as shown in FIG. 2. A cam track 64, shown in detail in FIGS. 1 and 5, is disposed beneath the floor 22 of the unloading trough below and in registry with groove 60. A plurality of cam surfaces 66 are provided at spaced intervals along the bottom of the track, as shown in FIG. 5. In this case only two such cam members 66 are shown, however, if the bale is of the three wire type conventionally made by the large heavy-duty balers, then an additional cam member would have to be suitably positioned along the track 64. The spacing of the cam members is such that the cutting jaws will be open to receive a bale band, close on the band to sever it and open again to receive the next band as the carriage moves the cutting means across the trough.

A receiving cup 68 is positioned in the lower portion of the forward wall 20 of the unloading trough, opening into the trough, and above the groove 62. The receiving cup 68 is comprised of a separating plate 70 which separates the conical interior 72 of the cup into two portions, as shown in detail in FIGS. 7, 9 and 10. The cup is so aligned as to receive the open ends of the twister bars as they traverse across the unloading trough so that one bar is above plate 70 and the other bar is below plate 70. A drive shaft 74 is suitably connected to the rear portion of receiving cup 68 and extends forwardly with respect to the bale wagon chassis structure to an end portion which is supported by a bearing 76. The bearing 76 is suitably fastened to an apertured mounting frame 78 which extends forwardly from wall 20 of the unloading trough. A hydraulic motor M is suitably drivingly connected to shaft 74, as shown in FIG. 3. Specifically, as shown in FIG. 11, motor M is drivingly connected to a sprocket 87 by a drive chain 91. Sprocket 87 is fixed to shaft 88 and drives sprocket 86 which in turn drives sprocket 82, fixed to shaft 74, by a drive chain 84. The rotation of shaft 74 turns sprocket 81 fixed thereon which in turn drives drive chain 80 which extends transversely across the wagon chassis structure parallel to the unloading trough to provide driving force to the other side. The shaft 88 extends in a fore-and-aft direction beneath the unloading trough and the band removal device as shown in FIG. 1. The shaft 88 is supported by a plurality of downwardly extending brackets 89 and 92 and bearings 90. A bracket 94 which is fixed to the underside of carriage 36 depends therefrom and has fixed to the lower end thereof plate 95 having a pair of spaced apart collars 96 therein. The shaft 88 extends through the collars and a sprocket 98 positioned in the space between the collars. The collars 96 and sprocket 98 are slideably mounted on the shaft 88 and are movable back and forth therealong by the brackets 94. It is noted from FIG. 13 that sprocket 98 is keyed to the shaft 88 such that it can slide therealong as the carriage moves, but is rotatable with shaft 88 as the shaft is driven by motor M, thereby providing driving motion to sprocket 102. A chain 100 connects sprocket 98 to a sprocket 102, positioned on a stub shaft 104. The stub shaft 104 is supported by a bearing 106 to a plate 108 which suitably secures the rear portions of the twister bars 46. In this manner, driving force is transmitted from a suitable hydraulic motor M to the drive chain 80 and shaft 74. Shaft 74 then transfers power to shaft 104 through shaft 88 so that the twister bars may be driven from both ends when the carriage 36 is positioned in its forwardmost position with the open ends of the twister bars received in conical receiving cup 68. In this manner, the twister bars will be made somewhat rigid during the band twisting process so that they will not twist relative to each other but will instead, strip severed banding materials from the bales of crop material.

Figure 8:
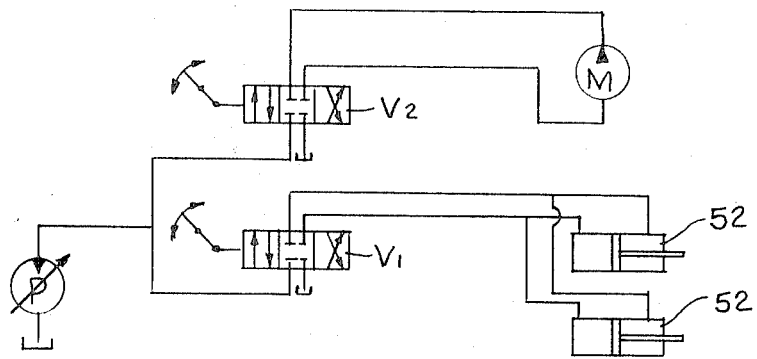
FIG. 8 is a schematic view illustrating the hydraulic circuit for actuating the device.

In operation, the bale stack is moved forwardly on the load carrying bed 16 toward the unloading trough in the conventional manner. The bale hooks are rotated to the up position shown in FIG. 1 and the first tier of bales of the bale stack is forced off the load carrying bed to rest thereon. Upon rotation of the bale hooks 29 to the down position, not shown, the bale tier falls downwardly into the trough 14. The hooks are then rotated to the up position and the upper bales of the tier are separated from the bottom two bales. A pump P, shown in FIG. 8, is driven from the prime mover, not shown, of the bale wagon and supplies hydraulic fluid to the system. Upon actuation of the valve $V_1$, the hydraulic cylinders 52 are caused to draw the two carriages 36 longitudinally toward the unloading trough so that the cutting means 44 and the stripper bars 46 begin to travel across the bottom of the trough. The bale banding material, the wire or cord, designated by the letter W extends around a bale B as shown in FIG. 5, and is disposed transversely to the direction of travel of the cutting means 44 and the stripper bars 46. As the band removing means moves across the table, the jaws of the cutting mechanism 44 are biased open by means of a spring 110 which is fixed to bar 42 at one end and to the lever end 45 at the other. The jaws 44a and 44b then engage the banding material W as they pass across the unloading trough while at the same time the stripper bars gather a strand at a time of the banding material W between the two bars. As the cutting means continues its traverse across the unloading trough, the lever end 45 of the cutting jaws engages and is forced upwardly by the cam surface 66. In this manner, the jaws are caused to close, severing the banding material as it goes. Similarly, the cutting mechanism 44 will sever the remaining banding materials before it makes a complete trip across the bottom of the trough. The twister bars will gather all the strands W. When hydraulic cylinder 52 has drawn carriage 36 and the cutting mechanism and stripping bars all the way across the trough, the open ends of the stripper bars have been received within the conical opening 72 of the receiving cup. At this point, a second valve $V_2$ is actuated causing a hydraulic motor M to provide driving force to shaft 74 which, in turn, causes a rotation of the receiving cups 68 and the stripper bars 46 through the driving connection described hereinbefore. With the banding material previously severed by the cutting means 44, and the bands disposed between the stripper bars, the banding material W will be twisted around the stripper bars as the bars are rotated by the driving means. In this way, all the banding material is removed from the bale at one time. The valve $V_2$ is then returned to the normal center position so that the rotary motion of the stripper bars is halted and the valve $V_1$ is actuated in the reverse direction so that the cylinders 52 force the carriage 36 rearwardly in the frame structure so that the cutting means and the stripper bars are moved rearwardly with respect to the unloading trough. As the stripper bars are withdrawn through plate 48, the twisted banding material wrapped around the bars contacts stripper plate 50 so that the twisted material falls free of the stripper bars when they reach the furthest rearward position shown in FIG. 2. The coil of twisted material falls downwardly through grooves 62, 64 to the ground below. At this point the cross conveyor 26 is actuated so that it travels across the unloading trough forcing the unbound bales out one end of the trough and into the desired feeding area.

While this invention has been described in connection with a single embodiment, it will be understood that this embodiment is capable of modifications and that this application is intended to cover any variations, uses, or adaptations following, in general, the principles of the invention and including such departures from the present disclosure as come within the known or customary practice in the art to which the invention pertains.

Having thus described my invention, what I claim is:

1. A device for removing banding material from a bale of crop material comprising:
    a bale support;
    frame means adjacent said bale support;
    carriage means supported by said frame means and movable with respect to said frame means and said bale support;
    band severing means on said carriage means operative to engage and sever the banding material around a bale of hay;
    band twisting means on said carriage means adapted to engage and remove the banding material around a bale of crop material, said band removing means comprises a pair of parallel spaced apart bars open at one end for receiving banding material therebetween and rotatably connected to said carriage means at the other end; and
    power means for moving said carriage means.

2. A device as recited in claim 1 wherein said severing means comprises a pair of cooperating jaws with one jaw having a lever arm extending therefrom, and cam means disposed on said frame means for selectively engagement with said lever arm for actuating said cutting jaws.

3. A device as recited in claim 1 wherein rotatable cup driving means is provided adjacent said bale support opposite said carriage means and adapted to receive the open end of said parallel spaced bars, said parallel bars being simultaneously rotatively driven at said carriage end and by said cup means, whereby said wire around said bales of hay is twisted around said parallel bars.

4. A device for removing banding material encircling a bale of crop material comprising:
    means for severing said banding material; means for twisting said severed banding material to remove it from the bale of crop material, said twisting means including a pair of parallel spaced bar members being open at one end for receiving the banding material therebetween and a cup means for receiving said bars at said open end, said twisting means being longitudinally movable with respect to said cup means and rotatable therewith; and means for driving said twisting means.

5. A device, as recited in claim 4, wherein said driving means for said twisting means rotates said bar members and said cup means simultaneously, said bar members being driven at the end away from said cup means and at the end received in said cup means by said cup means.

6. A device for removing banding material from a bale of crop material comprising:
    cutting jaws adapted to engage and cut the banding around the crop material;
    cam means selectively engageable with said jaws for actuating the same; and
    means for removing the banding material after it has been cut by said jaws.

7. A device as recited in claim 6 wherein said cam means is stationarily fixed and wherein said cutting jaws are mounted on a movable carriage disposed such that said jaws are aligned for engagement with said stationary cam means, whereby the selective movement of said carriage results in the actuation of said jaws by said cam means.

8. A device as recited in claim 7 wherein a bale support is transversely disposed relative to the directional movement of said carriage and spaced thereabove such that said jaws engage and cut the banding material disposed on the underside of the bale.

9. A device for removing banding material from a bale of crop material comprising:
    an elongated bale support;
    frame structure disposed generally below and adjacent said bale support;
    a carriage mounted in said frame support and movable back and forth in a transverse direction relative to said bale support;
    wire cutting means mounted on said carriage and adapted to engage and cut the banding material on the underside of a bale as the bale is supported by said bale support; and
    means mounted on the carriage for removing the banding material from the bales, said removing means adapted to engage the banding material disposed on the underside of the bale as the bale is supported by said bale support and to remove the cut banding material therefrom.

10. A device as recited in claim 9 wherein said cutting means is mounted on said carriage so as to move in a horizontal plane generally coexistent with the horizontal plane of said bale support, thereby being in a position to engage said banding material disposed on the underside of the bale as said carriage is moved transversely with respect to the bale support.

11. A device as recited in claim 9 wherein said removing means is mounted on said carriage so as to move in a horizontal plane generally coexistent with the horizontal plane of said bale support, thereby being in a position to engage said banding material disposed on the underside of the bale as said carriage is moved transversely with respect to the bale support.

12. A device as recited in claim 10 wherein said cutting means comprises cam means selectively disposed below said bale support and jaw cutters aligned with said cam means and adapted to be actuated thereby as the carriage moves transversely relative to the bale support.

13. A device as recited in claim 11 wherein said removing means comprises a pair of parallel spaced bar members open at one end for receiving the banding material and wherein drive means is provided for rotatable turning said bar members such that the banding material is twisted therearound.

14. A device for removing banding material from a bale of crop material as said bales are discharged from a bale wagon, said wagon being able to move a stack of bales over the ground comprising, in combination:
    a chassis structure;
    bed means on said chassis structure for supporting a plurality of side-by-side bale tiers in stack form;
    bale discharging means having a discharge area on said chassis structure at one end of said bed means for receiving bales a tier at a time and discharging the bales one at a time;
    band removing means adjacent said discharge area and movable with respect thereto for stripping said banding material from said bales to be discharged, said band removing means comprising a carriage having band severing means and ban twisting means mounted thereon, said carriage being longitudinally movable with respect to said chassis structure in a frame fixed to and disposed below said discharge means; and means for moving said band removing means.

15. A device, as recited in claim 14, wherein said band severing and twisting means move transversely across said discharge area, said severing means comprising a cam actuated cutting means operable to engage and cut bale bands while passing across said area and said twisting means comprising a pair of open ended parallel spaced apart bar members for gathering bale bands therebetween as the bars move across said area.

16. A device, as recited in claim 15, wherein said twisting means are rotatable with respect to said discharge means and drive means are provided to rotate said twisting means at both ends of said bar members when said bar members are moved across said area whereby said bar members twist the severed bale bands from the bale as the bar members rotate.

* * * * *